Oct. 21, 1958 M. PRESTON 2,857,041
BULK MATERIAL TRIMMER FOR BOAT LOADING APPARATUS
Filed Aug. 6, 1956 3 Sheets-Sheet 1

INVENTOR.
MARTIN PRESTON,
BY

Oct. 21, 1958     M. PRESTON     2,857,041
BULK MATERIAL TRIMMER FOR BOAT LOADING APPARATUS
Filed Aug. 6, 1956     3 Sheets-Sheet 2

INVENTOR.
MARTIN PRESTON
BY
Justin E. Macklin

Oct. 21, 1958 M. PRESTON 2,857,041
BULK MATERIAL TRIMMER FOR BOAT LOADING APPARATUS
Filed Aug. 6, 1956 3 Sheets-Sheet 3

INVENTOR.
MARTIN PRESTON
BY
Justin L. Macklin,
ATTY

United States Patent Office 2,857,041
Patented Oct. 21, 1958

2,857,041

BULK MATERIAL TRIMMER FOR BOAT LOADING APPARATUS

Martin Preston, Shaker Heights, Ohio, assignor, by mesne assignments, to The Wellman Engineering Company, Cleveland, Ohio, a corporation of Ohio Application August 6, 1956, Serial No. 602,149

11 Claims. (Cl. 198—128)

This invention relates to trimmers such as used for distributing bulk material in the hulls of ships.

The general object is to provide a simple, efficient, durably constructed trimmer which will handle a large volume of loose material with great rapidity and with a minimum of impact or throwing action, whereby when used for loading a vessel with coal, for example, degradation of the coal or breaking up of its lumps and particles is avoided to a large degree, as compared to the rapid and forcible throwing action of trimmers of types heretofore widely used.

Obviously, to avoid forcibly throwing the coal or other cargo to accomplish the trimming of the cargo, it is desirable to extend the lateral conveyor of the trimmer a substantially greater distance from the vertical, telescoping chute.

Accordingly, an object of the present invention is to so movably support the longer conveyor portion of the trimmer that it may be retracted and so positioned as to present a substantially reduced transverse dimension each way from the vertical feeding chute for the purpose of entering and withdrawing from hatch openings.

As indicated heretofore, trimmers of this general nature have been equipped with motors for driving the belt of the laterally extending conveyor at sufficiently high speeds to throw the material many feet from the free or outer end thereof to reach the more remote positions in the hold of the ship. Such delivery belts being relatively short, and the throwing distances comparatively great, it has been found that the resulting rapid propelling and throwing of the load entails serious disadvantages.

Among the disadvantages are, not only the breaking up or degradation of the coal, which is understood to be very undesirable and to be avoided insofar as possible, but excessive wear on the conveyor belt and the difficulties of so engaging the material as to effectively move the large volume desired at the high belt speeds required.

It is recognized that in the handling of the coal from the hopper at the upper portion of the ship-loading apparatus downwardly through a transverse or sloping chute into the vertical telescoping chute and thence onto the lateral trimmer-conveyor, the operation is carried out as far as possible without permitting the coal to drop or fall freely for any considerable distance. In this connection, it is desired that movement of the coal from the vertical chute onto the trimmer belt should likewise be in a continuous large volume without any abrupt movement or severe impact.

A problem presented is to control this slow movement of a solid flowing stream of coal while avoiding dropping and breaking and yet conveying the desired volume, in a given time, to the long trimmer belt and along it to the desired positions in the hold of the ship. Accordingly, another object of the present invention is to provide the trimmer mounting and the conveyor chute leading thereto of such construction that the flow may be free, rapid and continuous.

A more specific object is to so mount the long, laterally extending trimmer-conveyor that it may be readily swung from its substantially horizontal position to a position where its rear portion extends upwardly adjacent to the vertical chute and its outer, and now lower, end is somewhat below and withdrawn toward the center line of the vertical chute, thus extending at either side thereof a relatively short distance whereby it may be readily passed through the hatch openings of the decks of a ship.

A more specific object is to so mount the lateral conveyor trimmer frame that it may be tilted upwardly and downwardly for its trimming operation, and by the same mechanism be swung to its retracted or idle position, and to its outwardly extending trimming position, under the control of simple mechanism such as hydraulic cylinders.

Advantages of the present invention attained by the structure to be hereinafter described include sufficient movement of the coal without degradation to deliver the required volume in a given time and at the relatively greater distances from the vertical chute and at comparatively slow speeds of movement.

Previously attempts to construct a longer trimmer conveyor which could be passed through the hatch openings have included a proposal to form the long conveyor in a curve and retract it by moving it somewhat along its own curving contour. However, difficulties of holding the belt in the curve while driving it efficiently were encountered, whereas the present invention permits the utilization of a straight conveyor which has advantages of simplicity in construction and mounting, and efficient operation of the conveyor belt. Incidentally, an advantage of the present construction is that the relatively slow speed of the conveyor belt and its comparatively efficient mounting and driving arrangement lends itself to much longer life of the belt.

Another advantage of the present arrangement is that the coal is so directed through a curved path from the vertical telescoping chute that it is deposited onto the conveyor belt at such an angle as to offer minimum resistance, as the material passes down from the vertical path onto the conveyor belt, avoiding impact, and thus further saving wear on the belt and avoiding the coal degradation.

Other objects and advantages will become apparent in the following description which relates to the accompanying drawings, in which.

Figures 1, 2:
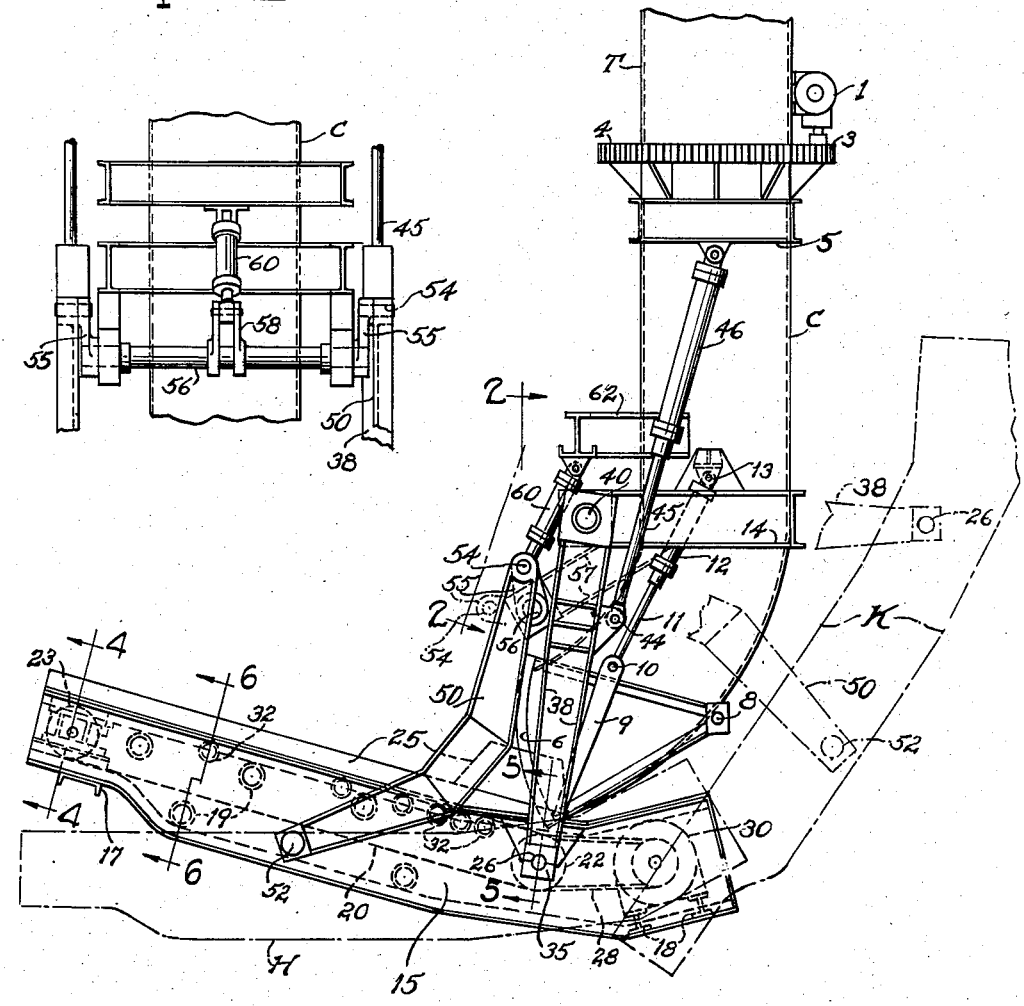
Fig. 1 is a side elevation of the present improved trimmer showing the trimmer conveyor linkage support and actuating means.
Fig. 2 is a side elevation showing a portion of the linkage and actuating means, the view being fragmentary and taken substantially as indicated by the lines 2—2 of Fig. 1.

Referring to the drawings by the use of reference characters, a cylindrical member C is rotatably connected to the lower section T of a telescoping chute and a suitable mechanism is provided for rotating the trimmer with relation to the chute. Although the rotating mechanism is not particularly related to the present invention, it may comprise the usual motor 1 and the gearing elements indicated at 2 for rotating the pinion 3 engaging a ring gear 4 rigidly connected with a supporting frame structure 5 carrying the cylindrical member C of the trimmer.

Supported on the lower portion of the cylinder C is a delivery elbow which deflects the coal laterally and discharges it onto the delivery belt, as will presently appear. This elbow, indicated generally at E, preferably has a curved end and rear wall, and flat sides and an open front. The curved rear wall extends toward the trimmer conveyor and preferably terminates just short of a position tangential to the horizontal, and its open side forms a discharge orifice which may be closed by a gate comprising an arcuate plate 6 mounted on segmental side members or arms, such as 7, connected with and movable upon a pivot 8 extending transversely of the rear wall. Rib members extending upwardly from the segmental portions at each side are each attached by a pivot pin 10 to an actuating rod 11 of an operating device comprising a hydraulic cylinder, indicated at 12, which in turn is pivoted at 13 to a frame member 14 rigid with the adjacent side of the elbow E.

In Fig. 1, this gate is indicated in the position closing the delivery orifice of the elbow. Obviously, the gate may be drawn upwardly to open the discharge orifice of the opening by drawing upwardly on the rods 11. This and other operating hydraulic cylinder and piston elements may be so connected with the source of hydraulic pressure fluid as to permit the revolution or turning motion of the elbow and trimmer conveyor. Similarly, other power supplying means, as for the motor driving the trimmer belt, are so connected with control means as to permit free rotation, as is customary with such structures.

The trimmer conveyor frame comprises side members 15 and suitable cross members such as indicated at 17, 18 and 19, forming a rigid hollow structure within which is mounted the conveyor-trimmer belt 20 and driving mechanism, the belt being exposed at the upper portion and extending over pulleys or drums 22 and 23. The upper reach of the belt and material guide plates 25 at each side form a trough by which the material is confined and along which it moves from the elbow delivery orifice to the outer end of the trimmer conveyor.

As shown, the drum 22 is rotatable on a fixed shaft 26, while a driving means includes a sprocket 27 on the shaft 26, a sprocket chain 28, and a sprocket on the shaft of a motor 30. The motor is rigidly carried by cross members, such as 18, within the housing at the rear of the zone of delivery of material onto the belt. The upper reach of the belt is supported by a plurality of rollers such as indicated at 32, those adjacent to the material delivery elbow being closely spaced to reinforce the belt at the zone where the material is discharged from the elbow onto the belt and more widely spaced near the delivery end, as shown.

The conveyor structure comprising the rigid housing, belt, motor and driving mechanism is so supported that its angle may be adjusted upwardly from the horizontal and is carried by means which also provide for swinging it upwardly and to the rear of the elbow E, as will now be described.

Figure 5:
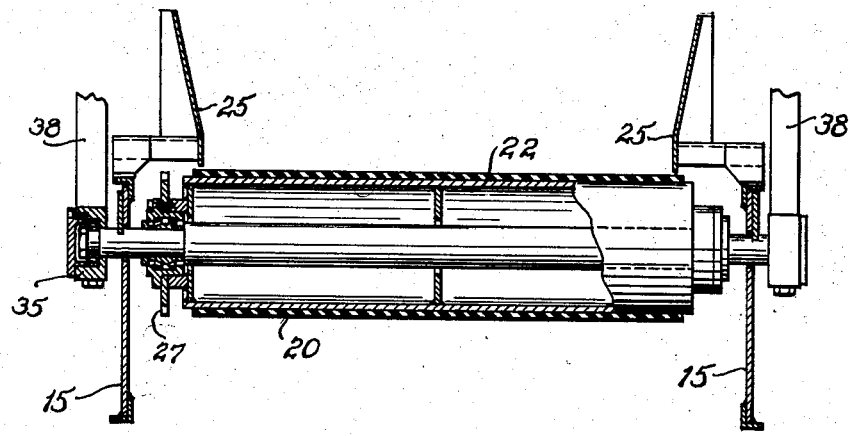
Fig. 5 is a similar sectional detail view taken substantially on a plane indicated by the line 5—5 of Fig. 1.

As shown, the non-rotating shaft 26 is utilized for supporting a portion of the weight of the conveyor assembly, the ends of this shaft being extended outwardly through and in engagement with the side members of the conveyor housing, as appears particularly in Fig. 5. The ends of the shaft 26 are embraced by bearings 35 which are carried on the lower ends of a pair of links 38 pivotally suspended from the frame members, as at 14, on pivots indicated at 40. Thus, a large portion of the weight of the belt and of material near the driving roller, as well as the rear of the frame, is carried on these links 38. Obviously, suitable gusset plates and trunnions attached to the side members of the conveyor frame may be utilized instead of extending the shaft 26, which, however, by coincidence of design, is suitably located for the purposes of the pivoting movements, as will hereinafter appear.

Figure 3:
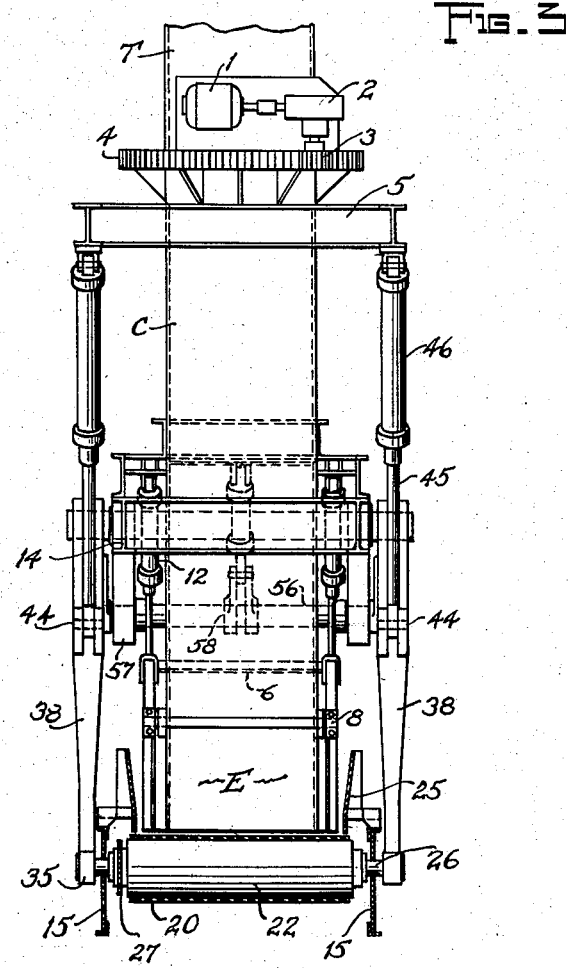
Fig. 3 is a rear elevation taken at right angles to that of Fig. 1, the lower portion being shown partially in section to illustrate the driving roller for the conveyor belt.
Figure 7:
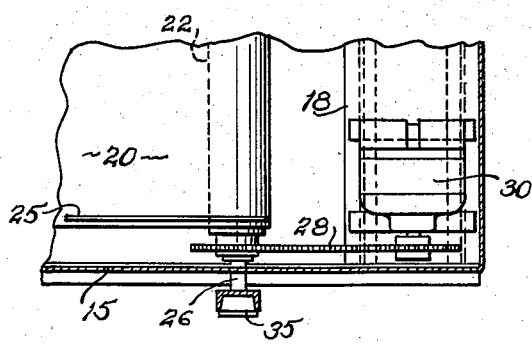
Fig. 7 is a fragmentary sectional plan view of the driving motor and rear roller and driving connection thereto. The plane of the section may be assumed to be taken above the motor and the rear belt driving motor and beneath a cover portion above it.
Figure 6:
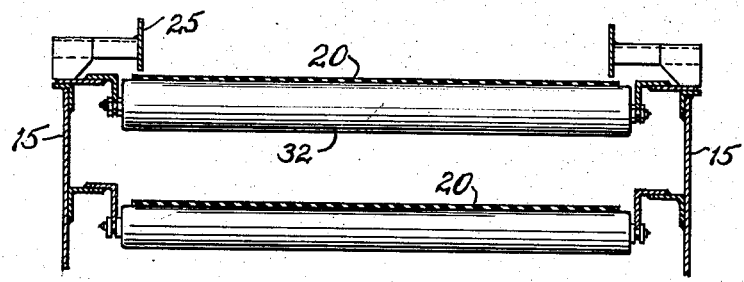
Fig. 6 is a sectional view indicating the supporting idler rollers taken on a plane indicated by the line 6—6 of Fig. 1.
Figure 4:
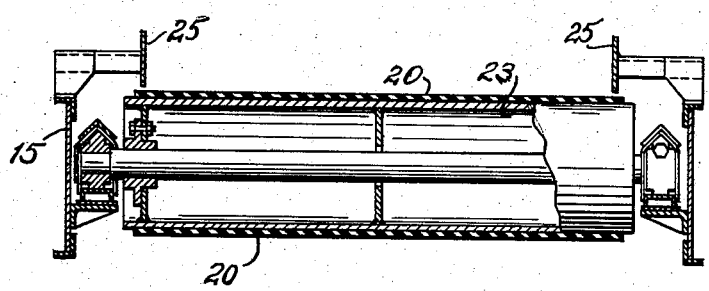
Fig. 4 is a vertical sectional detail taken at the delivery end of the trimmer conveyor, as indicated by line 4—4 of Fig. 1.

The links 38 are mounted outside of the frame and supporting members, as appears in Fig. 3, and thus, they may swing rearwardly around the pivots 40, carrying the conveyor frame rearwardly and upwardly around the curve of the elbow E. This swinging may be effected by any suitable mechanism.

As shown, a pivot 44 is attached to the rear side of each of the links 38, and this pivot is connected with an actuating rod 45 of a hydraulic cylinder 46, the upper end of which is pivoted at 47 to the upper frame member 5, which, as previously indicated, is rigid with the upper portion C of the rotatable elbow E.

While the link 38 may remain stationary, the outer end of the delivery belt conveyor frame may be raised and lowered, swinging about the bearings 35. This movement may be effected by an additional pair of supporting links 50, which are so mounted as to swing rearwardly with the links 38, and which are also connected with a means for raising and lowering the outer or free end of the conveyor frame.

As appears in Figs. 1 and 2, the upper ends of the links 50 are journalled at 54 to crank arms 55 on a crankshaft 56, mounted in downwardly and forwardly extending frame members 57 rigid with the frame members 14.

At the middle portion of the shaft 56 are rigid crank arms 58 pivotally connected with the plunger of a hydraulic operating cylinder 60, in turn pivoted at its upper end to a frame member 62. The links 50 are shown as so formed as to bring the middle portion of each link toward its adjacent link 38, thus permitting the chute and elbow to be brought closer to the side of the opening of a hatch, while still engaging and supporting the conveyor frame at a substantial distance from the pivot bearings 35 of the links 38.

It will be seen that the operation of the cylinder and crank arms connected with the links 50 is such that the conveyor frame may be raised or lowered through a limited arc from the horizontal upwardly, or returned to the horizontal, the upper position being shown in solid lines in Fig. 1, and the horizontal position being shown in dot and dash lines at H in the same figure.

To bring the conveyor somewhat beneath and upwardly along the rear of the elbow, and thus very substantially reduce the lateral extent for passing it through hatch openings, the crank arms 55 may first be lowered to bring the conveyor to a substantially horizontal position. Of course, if there be coal or loose cargo in the chute, the gate 6 is closed by the hydraulic cylinders 12 and the conveyor may now be swung rearwardly and upwardly by the action of the cylinders and rods 46 and 45 acting on the links 38 to swing them rearwardly and simultaneously swinging the links 50, thus carrying the conveyor frame body substantially to the position shown in broken lines at K in Fig. 1.

In the position indicated by the broken lines K, the outermost extremity of the motor and of the trimmer-conveyor is at a relatively short distance from the center line of the chute C, while the lower or outermost end of the conveyor frame stands substantially beneath the elbow E. Thus, the overall spread from the then position of the crank arms 55 and pivots 54 of the links 50 to the part of the conveyor frame supporting the motor (shown as slightly broken away) is sufficiently short to prevent it from passing through comparatively small hatch openings in the decks of ships or vessels.

Obviously, a reverse movement of the cylinder rod 45 may quickly lower the frame from the position indicated by the broken lines K to the horizontal position H, where for operating purposes during the loading, the link 38 is normally held firmly in the position shown in solid lines in Fig. 1. The links 59, as above indicated, may be raised and lowered slightly to elevate the angle of the trimmer-conveyor by swinging the crank arms 55 upwardly as described.

Hydraulic liquid pressure may be supplied to the operating cylinders 12, 46 and 60 through suitable connections (not shown) and, as it may be assumed, under the control of an operator.

From the foregoing description, it will be seen that essentially the trimmer may operate in the manner well known, namely, the motor may drive the trimmer-conveyor belt at any desired speed. Assuming that the chute has been filled with coal, the gate 6 may now be raised, permitting the coal to flow freely and rapidly onto the upper reach of the belt 20, coming onto the belt in a substantially tangential curving path, and being carried by the belt substantially to the sides of the ship where it may be deposited with a minimum of impact or throwing action. It is also assumed that provision is made for substantially filling the vertical chute at all times, and that the flow of coal onto the trimmer-conveyor is thus continuous and will be so handled as to prevent degradation of such frangible material as coal or the like, while the effectiveness of the trimmer in depositing the material where desired is increased by reason of the exceptionally long trimmer-conveyor, which may, nevertheless, be conveniently passed into and outwardly through the hatch openings.

It is to be understood that various mechanical modifications may be made in carrying out the invention without departing from the spirit of the invention, and its essential characteristics of construction and operation, as defined in the appended claims.

Having thus described my invention, what I claim is:

1. A trimmer for boat loading apparatus adapted to control downward flow of granular material and to distribute the material within the hold of a vessel, and comprising a rotatably supported elbow structure having a tubular upright portion adapted for attachment to a vertical chute and including laterally extending conveyor material delivery member, said member including a frame, a material conveyor belt and means carried by the frame for driving the belt, two pairs of link arms pivotally connected to the elbow structure at separated points, one pair at each side of the elbow and each pair being pivotally connected on a common axis and at longitudinally separated points to the delivery member, and means for swinging said supporting links to project the delivery member laterally from the elbow and to withdraw the same beneath and upwardly alongside thereof.

2. A boat loading apparatus for handling granular material and adapted to be attached to a downwardly extending chute and including an elbow and means for rotatably connecting the elbow to the chute, said elbow having a curved wall and a discharge opening adapted to deliver the material laterally in a path substantially tangential to the horizontal, a trimmer conveyor for receiving and moving material so delivered and including a conveyor belt, means for driving the belt, and a supporting frame for the belt and driving means adapted to be extended a substantial distance laterally from the discharge opening of the elbow, means for swingably supporting the trimmer conveyor and arranged to permit it to be extended laterally from the elbow and to be withdrawn partially beneath and upwardly alongside of the elbow, said later means including a pair of links at each side of the supporting frame and pivots connecting one of each pair of said links at separated points to each side of the trimmer conveyor frame and pivoted at separated points to the elbow, power means carried by the elbow and connected with the conveyor frame for swinging the links and frame, and separate power means connected to one pair of links to tilt the conveyor frame about the pivots of the other pair of links.

3. The apparatus defined in claim 2 in which one link of each pair on each side of the frame is so shaped that one portion extends close to the elbow and another close to the frame, whereby the elbow may be brought nearer to the side of a hatch opening to permit the trimmer-conveyor to extend a greater distance beneath the deck.

4. The loading apparatus described in claim 2 in which one supporting link of each pair on each side is shaped to extend downwardly for a distance close to the elbow and then forwardly, and is pivotally connected to the frame toward the forward end of the trimmer conveyor, movable means carrying the pivots at the upper end of these forward links and adapted to simultaneously raise and lower the last-named pivots to tilt the trimmer frame and belt.

5. In a trimmer adapted to be supported at the lower end of a delivery chute for distributing material below and laterally from the hatch opening of a boat, an elbow adapted to be rotated about an axis of the chute, a trimmer conveyor delivery member comprising a frame, a conveyor belt and means for driving the belt carried by the frame, the elbow having an opening and means controlling the flow of material therethrough onto the conveyor in a path substantially tangential thereto, the length of the trimmer conveyor frame and belt and its laterally projecting distance from the opposite side of the elbow being greater than the hatch opening of the boat, means for swingably supporting the trimmer conveyor member in its laterally extended position and for moving it to a retracted position partially beneath and upwardly alongside of the upright portion of the elbow, said swingable supporting means including a link pivotally connected at one side of the elbow and to the trimmer conveyor frame at points aligned with an axis substantially below the elbow, another pair of links pivotally connected on a common axis at opposite sides of said frame and to the elbow, and said connection with the elbow being on a common axis and on a movable member thus permitting raising and lowering of the outer end of the conveyor frame swinging it about the lower pivots of the first-named links.

6. The structure defined in claim 5 including hydraulic cylinder motors connected to the first-mentioned links and to the trimmer-conveyor frame for swinging the trimmer conveyor member bodily from its extended to its withdrawn position.

7. The structure defined in claim 5 in which the support for the forward links comprises crank arms journaled thereto and including a power means connected with and adapted to move the crank through a partial turn.

8. A trimmer of the character described comprising a conveyor, a rotatably supported member having an upright chute portion and a curved elbow having an opening for delivering material substantially tangentially onto the conveyor, an elongated straight delivery conveyor frame, a plurality of supporting link arms pivotally attached to the chute and to the conveyor at longitudinally separated points and at both sides of the conveyor, and means for swinging the link arms to move the conveyor from a laterally extending position to a position beneath and alongside of the chute and elbow, the length of said conveyor being substantially four times that of the transverse dimension of the upright chute.

9. The bulk material trimmer defined in claim 8 in which one pair of the supporting link arms is connected to the delivery conveyor on axially aligned pivots positioned outwardly from the elbow toward the delivery end of the conveyor, and means pivotally connected to the upper ends of said pair of link arms and including a movable member and power means for raising and lowering the movable member and said pivotal connecting means whereby the outer end of the conveyor may be raised or lowered, and whereby the last-named pivotal connecting means when lowered may permit clearance between the elbow and conveyor while swinging the conveyor to a laterally retracted position.

10. A bulk material trimmer for boat loading adapted to control downward flow of granular material and to distribute material within the hold of a vessel, and comprising a rotatably supported elbow structure having a tubular upright portion adapted for attachment to a vertical chute, and including a laterally extending material conveyor and delivery member, said member including a frame and a material conveyor belt and means carried by the frame for driving the belt, a pair of link arms pivotally connected to the elbow structure on a common axis and at opposite sides and pivotally connected to the material conveyor frame on a common axis and on opposite sides thereof, means for swinging said link arms about the axis at the elbow structure to move the conveyor frame to and from a laterally extending position and to a position beneath and substantially upwardly alongside of the elbow structure and the tubular upright portion, an element pivotally connected to the conveyor frame on an axis removed longitudinally of the frame from the pivots connecting the link arms to the frame, and power actuated means connecting said element with the elbow structure for raising and lowering the outer end of the conveyor frame by swinging it about the axis at which the first mentioned links are connected to the frame.

11. The trimmer defined in claim 10 in which the means for swinging the first mentioned link arms and the means for raising and lowering the outer end of the conveyor frame, include power pistons and cylinders operatively connected to the link arms and to the conveyor frame, respectively.

References Cited in the file of this patent

UNITED STATES PATENTS

| | | |
|---|---|---|
| 1,441,659 | Case | Jan. 9, 1923 |
| 1,895,608 | Conley | Jan. 31, 1933 |
| 2,215,736 | Jones | Sept. 24, 1940 |

FOREIGN PATENTS

| | | |
|---|---|---|
| 893,034 | Germany | Oct. 12, 1953 |